(12) United States Patent
Frankenberger

(10) Patent No.: US 10,232,927 B2
(45) Date of Patent: Mar. 19, 2019

(54) SIGNAL INITIATION FOR AIRCRAFT DOORS

(71) Applicant: Airbus Operations GmbH, Hamburg (DE)

(72) Inventor: Eckart Frankenberger, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 132 days.

(21) Appl. No.: 14/722,772

(22) Filed: May 27, 2015

(65) Prior Publication Data

US 2015/0344121 A1    Dec. 3, 2015

(30) Foreign Application Priority Data

May 28, 2014 (DE) .......... 10 2014 008 060

(51) Int. Cl.
  *B64C 1/14* (2006.01)

(52) U.S. Cl.
  CPC .......... *B64C 1/1407* (2013.01); *B64C 1/1415* (2013.01)

(58) Field of Classification Search
  CPC ............... B64C 1/1407; B64C 1/1415
  USPC ....................................... 244/129.5
  See application file for complete search history.

(56) References Cited

U.S. PATENT DOCUMENTS

| | | | | |
|---|---|---|---|---|
| 4,497,462 A * | 2/1985 | Hamatani | ............. | B64C 1/1415 244/129.5 |
| 4,680,891 A | 7/1987 | Perkins | | |
| 5,251,851 A * | 10/1993 | Herrmann | ............... | B64C 1/143 244/129.5 |
| 5,480,109 A * | 1/1996 | Klein | .................... | B64C 1/1407 244/129.5 |
| 5,735,487 A * | 4/1998 | Abild | .................... | B64C 1/1415 244/129.5 |
| 5,881,973 A * | 3/1999 | Agajanian | ............... | E05B 47/00 244/129.5 |
| 6,158,692 A * | 12/2000 | Abild | .................... | B64C 1/1415 244/129.5 |
| 6,467,729 B2 * | 10/2002 | Buchs | .................... | B64C 1/1407 244/129.5 |

(Continued)

FOREIGN PATENT DOCUMENTS

| | | |
|---|---|---|
| DE | 2941950 | 2/1981 |
| DE | 69621316 | 9/2002 |
| DE | 102011004400 | 8/2012 |

OTHER PUBLICATIONS

German Search Report, dated May 28, 2014.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A signal-initiation device for initiating control signals in an aircraft fuselage, an aircraft fuselage including a signal-initiation device of such a type, an aircraft including such a fuselage, and the use of a signal-initiation device of such a type. The signal-initiation device for initiating control signals in an aircraft fuselage comprises a switching area configured to generate at least one control signal for controlling at least one orifice shutter present in the aircraft fuselage; and an initiating component connected to the switching area, configured to introduce the at least one control signal into the aircraft fuselage.

8 Claims, 2 Drawing Sheets

(56) References Cited

U.S. PATENT DOCUMENTS

| | | | | |
|---|---|---|---|---|
| 6,547,185 B2* | 4/2003 | Erben | ................... | B64C 1/1407 |
| | | | | 244/129.4 |
| 9,199,716 B2* | 12/2015 | Knijnenburg | ......... | B64C 1/1407 |
| 2013/0318873 A1 | 12/2013 | Knijenburg | | |

* cited by examiner

SIGNAL INITIATION FOR AIRCRAFT DOORS

CROSS-REFERENCES TO RELATED APPLICATIONS

This application claims the benefit of the German patent application No. 10 2014 008 060.9 filed on May 28, 2014, the entire disclosures of which are incorporated herein by way of reference.

BACKGROUND OF THE INVENTION

The present disclosure relates generally to the initiation of control signals. In particular, the present disclosure relates to a signal-initiation device for initiating control signals in an aircraft fuselage, to an aircraft fuselage including a signal-initiation device of such a type, to an aircraft including such a fuselage, and to the use of a signal-initiation device of such a type.

Orifice shutters that are present in an aircraft fuselage, such as aircraft doors and cargo doors, are nowadays operated, inter alia, hydraulically. For example, a cargo door, i.e., an orifice shutter that is present in the aircraft fuselage for opening and closing a cargo hold, is opened and closed hydraulically. The operating elements for the operation of the cargo door are accommodated nowadays behind a shutter in the aircraft fuselage alongside the cargo door in a so-called operating box (OP box). Usually mechanical operating elements are located in the OP box. The operating elements of the OP box consist of switches for the hydraulic system that opens and closes the cargo door via a hydraulic cylinder. A pressurized bushing routes the hydraulic pipes out of the fuselage into the OP box and to the mechanical operating elements.

For the purpose of retaining the atmospheric pressure in the cabin region of the aircraft even at high flight altitudes, the fuselage of passenger aircraft exhibits at least one pressurized region for the passengers. As a rule, the cargo hold of an aircraft is likewise under atmospheric pressure. Generating units and such like which are not reliant on atmospheric pressure are chiefly arranged outside the pressurized region(s) of the fuselage. An aircraft fuselage with one or more regions of such a type is usually designated as a pressurized fuselage. The OP box is likewise part of the pressurized fuselage and is accordingly kept appropriately stable. In the A350® aircraft manufactured by Airbus® the OP box has been constructed from carbon-fiber-reinforced plastic (CFRP) and, for example, from titanium sheet.

The saving of fuel is increasingly gaining in importance in aircraft. One measure for reducing the fuel consumption is the reduction of the weight of aircraft. Accordingly, it is desirable to configure components of an aircraft in a weight-saving manner. In accord therewith, it is desirable to design as many as possible of the components necessary for controlling orifice shutters that are present in an aircraft to be as light as possible.

SUMMARY OF THE INVENTION

A first aspect relates to a signal-initiation device for initiating control signals in an aircraft fuselage. The signal-initiation device comprises a switching area and an initiating component connected to the switching area. The switching area is configured to generate at least one control signal for controlling at least one orifice shutter that is present in the aircraft fuselage. The initiating component is configured to introduce the at least one control signal into the aircraft fuselage.

The switching area may be configured to generate at least one electrical control signal as the control signal. In this case the switching area may take the form of an electrical switching area or may include such a switching area. The switching area may be configured to generate at least one optical control signal as the control signal. In this case the switching area may take the form of an optical switching area or may include such a switching area. In other words, the at least one control signal may include at least one electrical control signal and/or at least one optical control signal.

Since the switching area and the initiating component may be regarded as almost weightless in comparison with known hydraulic arrangements, together with OP box, that are capable of being employed for controlling orifice shutters, a considerable reduction in weight can be obtained.

The switching area may also be designated as an operating area. Such an operating area may include one or more two-dimensional operating elements. By the term "switching area," a two-dimensional switching device may be understood that is configured to generate at least one control signal that is suitable to trigger a function assigned to the two-dimensional switching device. The electrical control signal may include an analogue electrical control signal or of a digital electrical control signal. The latter may assume the states HIGH (the state "1") or LOW (the state "0"). The electrical control signal may include an electric current. The optical control signal may include light. The light may have a wavelength that makes it possible to relay the light with the aid of fiber-optic components.

In connection with the switching area, the concept of "switching" does not necessarily have to be understood in the sense of switching something on and off—that is to say, an alternation between two stable states. It is equally conceivable that by means of the switching area, like in the case of a key (sometimes also designated as a push-button), only a gating pulse is relayed. For example, by means of the switching area merely a process may be started or triggered. This may be compared with the pressing and releasing of a key. For example, the switching area may be actuated like a key (a push-button) by pressing, and may then return to the starting position.

The switching area may, however, also execute an action in the sense of the conventional understanding of "switching" For example, the switching area may, like a mechanical switch, lock in place as "pressed" (the locking in place may be illustrated in various ways, e.g., by an appropriate representation on the switching area, or by an altered labelling) and in the case of a second operation may again "disengage," in a manner analogous to a mechanical switch. The "switching area" may in any case be regarded as a generic term for a two-dimensional key and a two-dimensional switch. The concept of the "operating area" may therefore also be used by way of generic term. The switching area may, for example, include at least one two-dimensionally configured operating element.

For example, the switching area may include at least one touch-sensitive two-dimensional switching element, such as, for example, a flat (electrical or optical) key or a flat (electrical or optical) keypad. Each one of the at least one touch-sensitive two-dimensional switching element may be configured to generate one of the at least one control signal in response to a touch. In the case of several switching elements, each one of the switching elements may, for example, generate a specific control signal. The respective control signals may serve for controlling various control instructions (e.g., opening or closing one and the same orifice shutter). Additionally or alternatively to this, the respective control signals may serve for controlling different orifice shutters.

The electrical switching area may include, for example, a piezoelectric switching area. The piezoelectric switching area may be configured to generate, upon influence of a mechanical force—such as, for example, a force evoked by touch—an electrical voltage and thereby a flow of current as an electrical control signal.

The switching area may be capable of being applied onto an external surface (an outer skin) of an aircraft, or capable of being integrated into the external surface (an outer skin) of an aircraft. For example, the switching area may be capable of being applied onto an external surface (an outer skin) of an aircraft fuselage, or capable of being integrated into the external surface (an outer skin) of an aircraft fuselage. Additionally or alternatively to this, the switching area may be part of an external appliance such as a tablet PC. In the case of a tablet PC the tablet PC can be connected to the initiating component with the aid of one or more cables and/or conductor tracks. As a result, the control signal generated with the aid of the tablet PC can be introduced into the aircraft fuselage via the initiating component. Irrespective of the precise configuration of the switching area, by actuation of the switching area the at least one control signal can be generated and can be introduced into the aircraft fuselage with the aid of the initiating component.

The switching area may have been applied on a foil carrier. The foil carrier may, for example, be capable of being applied onto an external surface (an outer skin) of an aircraft, for example of a fuselage. The foil carrier in this case faces towards the external surface, whereas the switching area faces away from the outer skin and, for example, is capable of being operated from outside. It is likewise conceivable that the switching area includes one or more printed conductor tracks or takes the form of one or more printed conductor tracks. For example, the switching area may be, or may have been, directly integrated into an external surface (an outer skin) of an aircraft, for example of a fuselage, via the printed conductor tracks.

The initiating component is configured to introduce the at least one control signal into the aircraft fuselage. By the terminology "into the aircraft fuselage," the interior (the interior space) of the aircraft fuselage may be understood. Of significance in this connection is the fact that with the aid of the initiating component the control signal generated outside the (external surface of the) aircraft-fuselage shell reaches a region that no longer lies outside the (external surface of the) aircraft-fuselage shell. This region may be an interior space of the aircraft fuselage surrounded by the aircraft-fuselage shell. The initiated control signal can then be relayed arbitrarily within the interior space of the aircraft fuselage with the aid of lines.

The initiating component may be configured to be electrically conductive. In this case the initiating component may be configured to introduce at least one electrical control signal into the aircraft fuselage. The initiating component may be configured to be optically conductive. In this case the initiating component may be configured to introduce at least one optical control signal into the aircraft fuselage. The initiating component may, for example, include one or more fiber-optic components. Usually designated as a fiber-optic component is an optical component that consists of several glass fibers, for example arranged in parallel, as optical waveguides which, as a rule, have been fused together to form a mechanically homogeneous block. A fiber-optic component is often also designated as (fused) fiber optics.

Irrespective of the specific initiation of the at least one control signal, the at least one control signal can be relayed with the aid of lines. The lines may include electrical lines or optical lines. The optical lines may include one or more optical waveguides, such as, for example, one or more glass fibers.

Through the introduction of the at least one control signal into the aircraft fuselage, orifice shutters that are present in the aircraft fuselage can be actuated and operated with the aid of the control signal. These orifice shutters may include, for example, electrically operable or hydraulically operable orifice shutters. In the latter case, for the purpose of conversion into a pressure moving the hydraulically operable orifice shutter, the at least one control signal can be routed to an actuator which converts the control signal appropriately into a pressure. It is equally conceivable that the control signal is converted by the actuator into another physical quantity, such as a mechanical motion. For the purpose of operating an electrical orifice shutter, the at least one electrical control signal can be relayed to the orifice shutter without interposition of an actuator.

The initiating component may include one or more electrically conductive rivets, or may take the form of an electrically conductive rivet. Various materials may be used for the electrically conductive rivet. Conceivable are, for example, copper, brass, aluminum alloys and titanium, to name just a few examples.

A second aspect relates to an aircraft fuselage including a signal-initiation device such as is described or has been described herein. The switching area of the signal-initiation device may have been applied on an external surface of the aircraft fuselage or may have been integrated into the external surface of the aircraft fuselage.

For example, the switching area may have been applied onto the external surface by means of a foil carrier. Alternatively, the switching area may have been imprinted (e.g. directly) into the external surface by means of one or more printed conductor tracks. In the last-mentioned case the initiation of the at least one control signal may also be effected by the door or door orifice itself. Expressed otherwise, the initiating component may have been laid through the door or door orifice, in order to introduce the at least one control signal into the aircraft fuselage. The initiating component may in this case extend further in the form of a line within the aircraft fuselage and may relay the initiated at least one control signal.

Irrespective of the precise configuration of the signal-initiation device, the at least one control signal is suitable to control at least one orifice shutter, for example a cargo door and/or an aircraft door, in the aircraft fuselage. For example, the switching area may include several switching elements, for example keypads, each of which serves for operating a different orifice shutter. Accordingly, by actuating a first switching element, for example by touching or by switching a first switching element, a first control signal can be generated, can be introduced into the aircraft fuselage via the initiating component, and can be routed from there to a first orifice shutter or to a first actuator. For example, depending on the switching status of the switching element, the orifice shutter can be opened or closed. By actuation, for example touching or switching, of a second switching element, a second control signal can be generated which can be introduced into the aircraft fuselage by the initiating component and can be routed from there to a second orifice shutter or to a second actuator. For example, depending on the switching status of the switching element, the orifice shutter can be opened or closed.

The aircraft fuselage may include, for example, an electrically operable orifice shutter. The electrically operable orifice shutter may be, for example, an electrically operable cargo door. Additionally or alternatively to this, the electrically operable orifice shutter may be an electrically operable aircraft door, such as a cabin door. The signal-initiation device may be configured to control the orifice shutter with the aid of the at least one control signal. For example, the switching area in the form of an electrical switching area may generate an electrical control signal for controlling the orifice shutter, which can then be introduced into the aircraft fuselage via the initiating component and can be relayed from there to the orifice shutter via an electrical line. The orifice shutter can then be controlled directly, for example opened or closed, via the electrical control signal.

Additionally or alternatively to this, the aircraft fuselage may include a hydraulically operable orifice shutter. The hydraulically operable orifice shutter may be, for example, a hydraulically operable cargo door and/or a hydraulically operable aircraft door such as a cabin door. The initiating component may be connected to an actuator so that the initiated control signal can be relayed to the actuator via a line. The actuator can convert the control signal into a pressure for opening or closing the orifice shutter.

A third aspect relates to an aircraft including a fuselage such as is described or has been described herein.

A fourth aspect relates to the use of a signal-initiation device such as is described or has been described herein for controlling an orifice shutter that is present in an aircraft fuselage. The orifice shutter may take the form, for example, of a cargo door and/or an aircraft door.

Even though some of the aspects described in the foregoing were described with reference to the signal-initiation device, these aspects may also be realized in corresponding manner in the aircraft fuselage, in the aircraft and in connection with the use of the signal-initiation device. Equally, the aspects described in the foregoing with reference to the aircraft fuselage may also be realized in corresponding manner in the signal-initiation device, in the aircraft and in connection with the use of the signal-initiation device.

BRIEF DESCRIPTION OF THE DRAWINGS

The present disclosure will be elucidated further on the basis of Figures. These Figures show schematically.

DETAILED DESCRIPTION OF THE PREFERRED EMBODIMENTS

In the following, specific details will be presented, without being restricted thereto, in order to provide a complete understanding of the present disclosure. To a person skilled in the art, however, it is clear that the present disclosure can be used in other embodiments which may diverge from the details presented below. For example, in the following it is always stated that the signal-initiation device has been integrated into the external surface of an aircraft fuselage or applied on the external surface of an aircraft fuselage. The signal-initiation device may, however, be present elsewhere, so long as an introduction into the aircraft fuselage is effected.

Even though embodiments will be described in the following with reference to a signal-initiation device that has been integrated into the external surface of an aircraft fuselage, the present disclosure is not restricted thereto. The signal-initiation device, however, may also have been applied onto the external surface in another way, such as, for example, being stuck onto the external surface of the shell.

Figure 2:
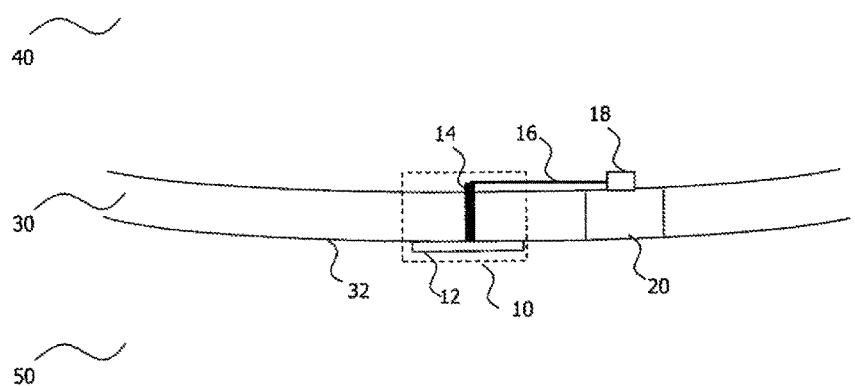
FIG. 2 is a detail of an aircraft-fuselage shell, on the external surface of which an embodiment of a signal-initiation device has been applied, or into the external surface of which an embodiment of a signal-initiation device has been integrated.

With reference to FIG. 2, an electrical control signal is always referred to, without being restricted thereto. Accordingly, the electrical control signal is introduced into the aircraft fuselage with the aid of an electrical initiating component and is relayed there with the aid of electrical lines. The reference to electricity serves purely for illustrating the disclosure and is in no way to be understood as restricting. Alternatively, it is conceivable to introduce an optical control signal, for example, into the aircraft fuselage with the aid of fiber-optic components. The initiated optical control signal may accordingly be relayed within the aircraft fuselage with the aid of optical lines and optical components.

The appended Figures serve merely for the purpose of clarifying embodiments. They are not true to scale and are intended merely to reflect the general concept of the disclosure in exemplary manner. For example, features that have been included in the Figures should in no way be considered as a necessary component.

Figure 1:
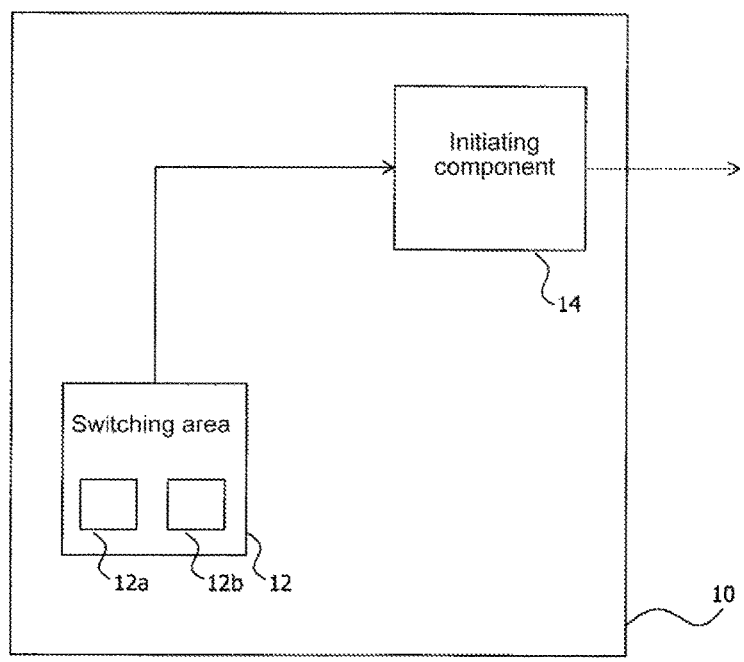
FIG. 1 is a block diagram of an embodiment of the signal-initiation device.

FIG. 1 shows a block diagram of a signal-initiation device 10 according to an embodiment. The signal-initiation device 10 comprises a switching area 12 and an initiating component 14. The initiating component 14 is connected to the switching area 12. Purely in exemplary manner, the switching area 12 comprises two touch-sensitive keypads 12a, 12b. The switching area 12 may, however, also include more or fewer keypads. When the first keypad 12a is touched, a first control signal is generated. When the second keypad 12b is touched, a second control signal is generated. The first and the second control signal may differ from one another or may be alike. Both control signals can be relayed to the initiating component 14 via the connection. The initiating component 14 can introduce the control signals 12a, 12b into the aircraft fuselage, as will be described more precisely with reference to FIG. 2.

FIG. 2 shows, in exemplary manner, how the signal-initiation device 10 may have been connected to an aircraft fuselage 30. The signal-initiation device 10 may be the signal-initiation device shown in the block diagram from FIG. 1.

Purely in exemplary manner, with reference to FIG. 2 it will be assumed that the switching area 12 is configured to generate an electrical control signal as a control signal. Accordingly, in the following the switching area will be designated as electrical switching area 12. For example, the electrical switching area may be piezoelectric, i.e., it may generate from a mechanical force an electrical voltage, and therefore an electric current as electrical control signal.

In FIG. 2 the electrical switching area 12 is integrated, for illustrative purposes, into the external surface 32 of the aircraft fuselage 30. To do this, the electrical switching area 12 is realized in exemplary manner with the aid of printed (e.g., also flexible) conductor tracks and is imprinted directly into the external surface 32 of the aircraft fuselage 30. An alternative that enters into consideration is to apply the electrical switching area 12 and the associated keypads 12a, 12b onto a foil carrier and to attach the foil carrier on the external surface 32, for example to stick it on. In any case, the signal-initiation device is arranged outside the external surface 32 (in a region 50 outside the shell of the aircraft fuselage 30).

When one of the keypads 12a, 12b is touched, a corresponding electrical control signal is generated and is introduced into the aircraft fuselage 30 via the initiating component 14. In purely exemplary manner, the initiating component 14 in FIG. 2 is formed as a rivet made of an electrically conductive material. According to FIG. 2 the rivet totally penetrates the shell of the aircraft fuselage 30, so that it can be contacted by the electrical line 16 in the interior 40 of the aircraft fuselage 30. Alternatively it is conceivable that the rivet 14 is shorter than the thickness of the shell and is contacted appropriately within the shell.

In the example from Example 2 the rivet 14 is contacted by the electrical line 16 in the interior 40 of the aircraft fuselage 30, so that the generated electrical control signal can, for example, be relayed to an actuator 18 connected to the electrical line 16. In the actuator 18 the electrical control signal is converted into a pressure, in order to open or close the hydraulically operable orifice shutter 20 that is present in the aircraft fuselage 30. Alternatively or additionally to the hydraulically operable orifice shutter 20, an electrically operable orifice shutter may be present which, without interposition of an actuator, can be controlled, for example opened or closed, directly with the aid of the electrical control signal.

In purely exemplary manner, and without being restricted thereto, for the purpose of illustrating the present disclosure it will be assumed in the following that the orifice shutter 20 takes the form of a hydraulically movable cargo door, and a further orifice shutter, not shown in FIG. 2, takes the form of an electrically operable orifice shutter. Furthermore, it will be assumed in purely exemplary manner that keypad 12a serves for controlling the hydraulically operable cargo door 20, and keypad 12b serves for controlling the electrically operable cargo door.

If a first cargo hold is to be loaded, an airport employee or airline employee responsible for this can operate—for example, touch—keypad 12a. In response thereto, keypad 12a generates a first electrical control signal. The first electrical control signal is routed into the interior of the aircraft fuselage 30 via the electrically conductive rivet 14. The electrical line 16 contacting the rivet routes the first electrical control signal to the actuator 18. The actuator 18 converts the first electrical control signal into a pressure for opening or closing the hydraulically operable cargo door 20. Depending on the status of the cargo door 20, the cargo door 20 is opened or closed on the basis of the first electrical control signal. If, for example, the cargo door 20 was open, the actuator 18 will close the cargo door 20 when it receives the first electrical control signal. Conversely, the actuator 18 will open the cargo door upon receiving the first electrical control signal if the cargo door 20 previously was closed.

If the electrical switching area 12 includes a switch instead of the keypad 12a taking the form of a pure push-button, then, depending on the state of the switch, a first electrical control signal with differing properties can be generated. For example, if the switch is brought into a first state, the first electrical control signal generated thereby can give rise to an opening of the cargo door 20. If, on the other hand, the switch is brought into a second state, the first electrical control signal generated thereby can give rise to a closing of the cargo door 20.

If a second cargo hold is now to be loaded, an airport employee or airline employee responsible for this can operate—for example, touch—keypad 12b. In response thereto, keypad 12b generates a second electrical control signal. The second electrical control signal is routed into the interior of the aircraft fuselage 30 via the electrically conductive rivet 14. The electrical line 16 contacting the rivet 14 routes the second electrical control signal to the electrically operable cargo door. Depending on the status of the electrically operable cargo door, the electrically operable cargo door is opened or closed on the basis of the second electrical control signal. If, for example, the electrically operable cargo door was open, the electrically operable cargo door is closed when it receives the second electrical control signal. Conversely, the cargo door is opened upon receiving the second electrical control signal if previously it was closed.

As described with reference to the cargo door 20, the electrical switching area may include a switch instead of the keypad 12b taking the form of a push-button.

With the aid of the signal-initiation device a very weight-saving option is provided for controlling—such as, for example, opening or closing—orifice shutters of an aircraft fuselage. In addition, the shape of the aircraft fuselage can be retained unchanged. For example, no pressurized OP box for receiving switches has to be provided. Furthermore, the costs are distinctly reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A signal-initiation device for initiating control signals in an aircraft fuselage, the signal-initiation device comprising:
   a switching area configured to generate at least one control signal for controlling at least one orifice shutter present in the aircraft fuselage wherein the switching area includes one or more printed conductor tracks and wherein an electrically conductive rivet contacts an electrical line of said printed conductor track; and
   an initiating component connected to the switching area, configured to introduce the at least one control signal into the aircraft fuselage,
   wherein the switching area is integrated into the external surface of an aircraft.

2. The signal-initiation device according to claim 1, wherein the switching area is configured to generate at least one electrical control signal as the control signal.

3. The signal-initiation device according to claim 1, wherein the switching area is configured to generate at least one optical control signal as the control signal.

4. The signal-initiation device according to claim 1, wherein the switching area includes at least one touch-sensitive two-dimensional switching element which is configured to generate the at least one control signal in response to a touch.

5. The signal-initiation device according to claim 1, wherein the switching area is configured to be applied onto an external surface of an aircraft.

6. The signal-initiation device according to claim 1, wherein the switching area is applied onto a foil carrier.

7. A signal-initiation device for initiating control signals in an aircraft fuselage, the signal-initiation device comprising:
   a switching area configured to generate at least one control signal for controlling at least one orifice shutter present in the aircraft fuselage; and
   an initiating component connected to the switching area, configured to introduce the at least one control signal into the aircraft fuselage;
   wherein the initiating component includes an electrically conductive rivet that contacts an electrical line of one or more printed conductor tracks.

8. The signal-initiation device according to claim 7, wherein the switching area includes said one or more printed conductor tracks imprinted directly into an external surface of the aircraft fuselage.

\* \* \* \* \*